United States Patent [19]

McDonnell

[11] Patent Number: 5,799,900
[45] Date of Patent: Sep. 1, 1998

[54] LANDING AND TAKE-OFF ASSEMBLY FOR VERTICAL TAKE-OFF AND LANDING AND HORIZONTAL FLIGHT AIRCRAFT

[75] Inventor: William R. McDonnell, St. Louis, Mo.

[73] Assignee: Advanced Aerospace Technologies, Inc., St. Louis, Mo.

[21] Appl. No.: 680,000

[22] Filed: Jul. 15, 1996

[51] Int. Cl.$^6$ ................................................. B64C 29/00
[52] U.S. Cl. ........................... 244/7 A; 244/115; 244/17.11
[58] Field of Search ................................. 24/7 R, 7 A, 7 B, 24/7 C, 17.11, 17.15, 17.17, 115, 116, 110 C, 110 F, 45 R, 45 A

[56] References Cited

U.S. PATENT DOCUMENTS

| | | | |
|---|---|---|---|
| 2,043,704 | 6/1936 | McPherren | 244/19 |
| 2,084,464 | 6/1937 | Stalker | 244/17 |
| 2,328,786 | 9/1943 | Crowder | 244/7 B |
| 2,382,460 | 8/1945 | Young | 244/7 |
| 2,387,762 | 10/1945 | Leonard | 244/7 |
| 2,444,781 | 7/1948 | Leonard | 244/7 |
| 2,479,125 | 8/1949 | Leonard | 244/7 |
| 2,552,115 | 5/1951 | Replogle | 244/7 B |
| 2,807,429 | 9/1957 | Hawkins, Jr. et al. | 244/116 |
| 2,866,608 | 12/1958 | Leonard | 244/7 |
| 3,116,040 | 12/1963 | Petrides et al. | 244/17.13 |
| 3,142,455 | 7/1964 | Wilford | 244/7 |
| 3,884,431 | 5/1975 | Burrell | 244/7 |
| 4,123,020 | 10/1978 | Korsak | 244/116 |
| 4,786,014 | 11/1988 | Pesando et al. | 244/115 |
| 5,289,994 | 3/1994 | Del Compo Aguilera | 244/7 B |
| 5,516,060 | 5/1996 | McDonnell | 244/713 |

FOREIGN PATENT DOCUMENTS 1292006  4/1969  Germany.

*Primary Examiner*—Galen L. Barefoot

[57] ABSTRACT

An aircraft adapted for flight in helicopter mode with its longitudinal axis oriented generally vertically and in airplane mode with its longitudinal axis oriented generally horizontally is provided with the capability of launching and landing with the tail end directed skyward. The invention also includes improvements to the controllability and efficiency of aircraft in helicopter mode provided by the stabilizer wings and relative rotation of the fuselage section about the aircraft's longitudinal axis. The aircraft has an elongate boom positioned between the rear fuselage and the stabilizer wings for engagement with a base structure. The base structure may be attached to a building, a trailer transporter, a ship or some other structure. The base may be a beam having latching arms that swing inward when pressure from the boom is applied, then trap the boom in a recess between the latching arm and beam, thereby suspending the aircraft. An actuator for releasing the latching arms is provided to allow the aircraft to launch.

22 Claims, 4 Drawing Sheets

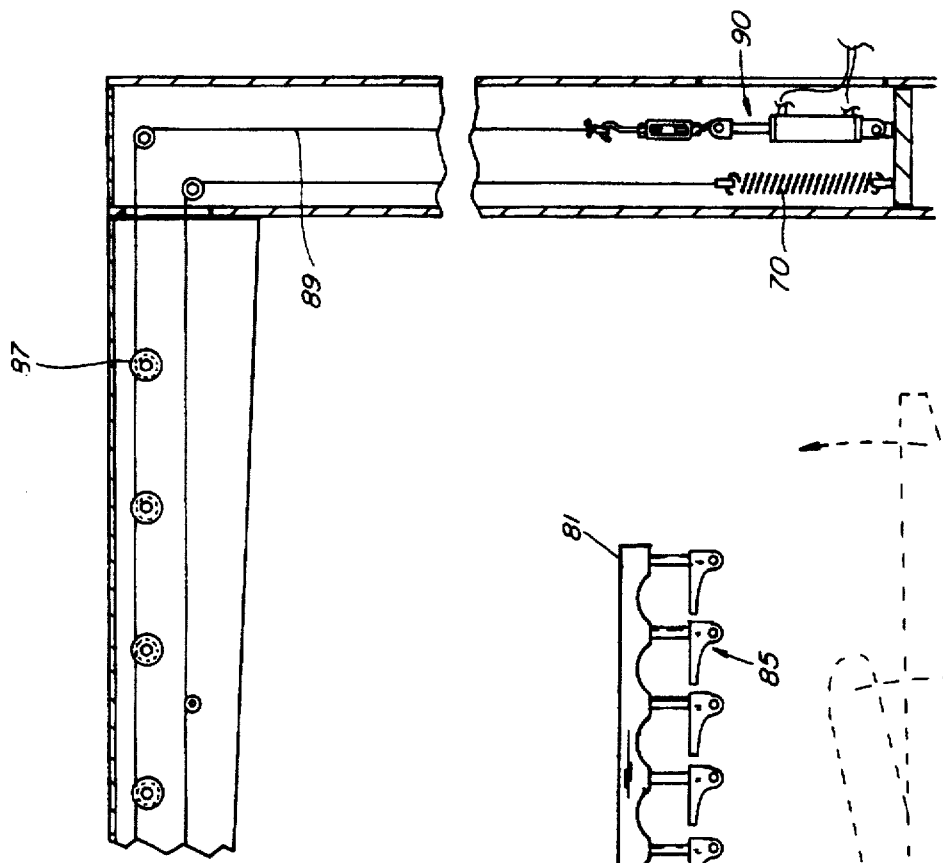
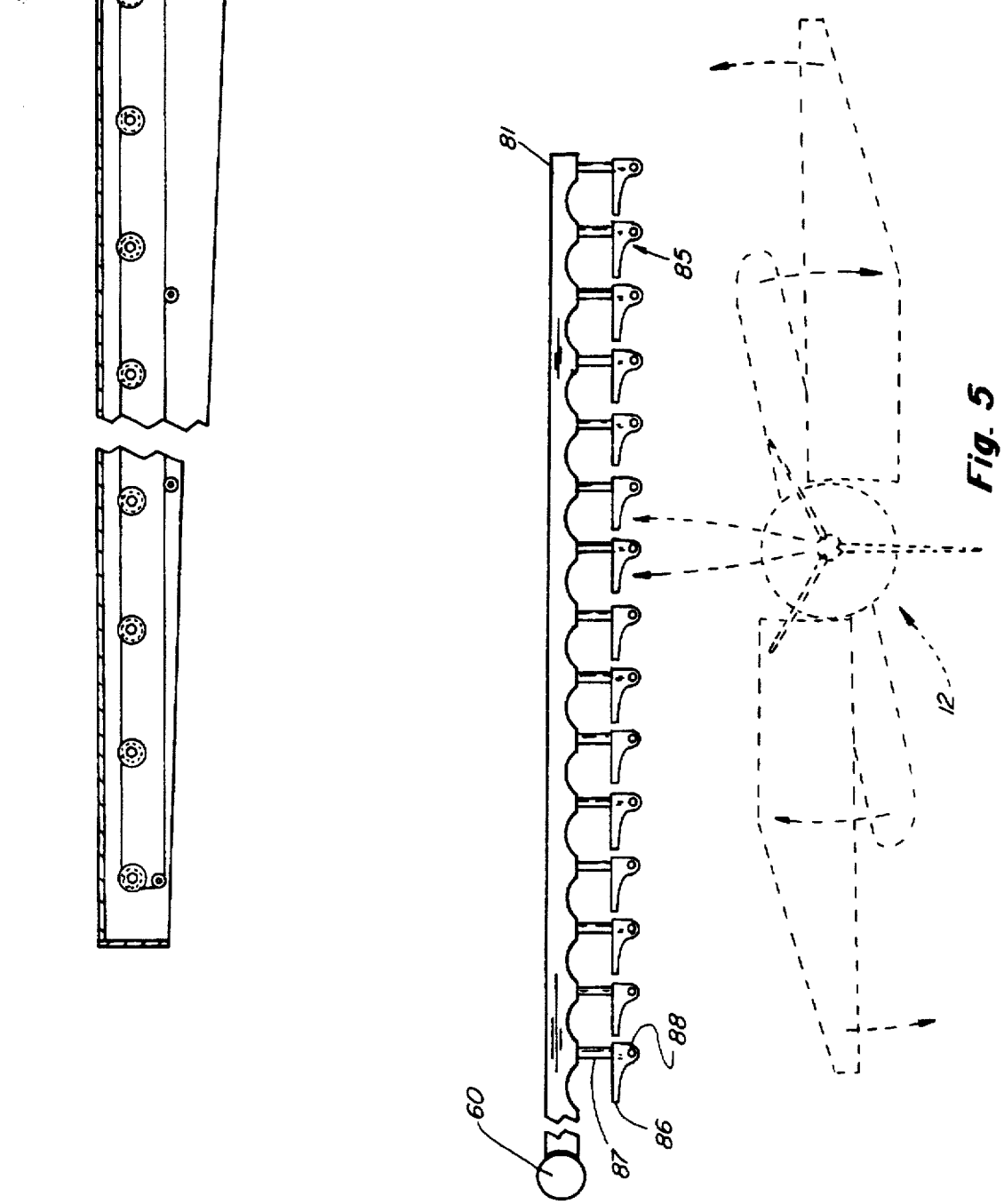

LANDING AND TAKE-OFF ASSEMBLY FOR VERTICAL TAKE-OFF AND LANDING AND HORIZONTAL FLIGHT AIRCRAFT

FIELD OF THE INVENTION

The present invention relates to the field of aircraft capable of converting between vertical flight, or helicopter mode flight, and horizontal flight, or airplane mode flight, where the rotors are employed as both helicopter rotor blades in vertical flight and as a fixed wing in horizontal flight. More particularly, the present invention includes an improved base docking structure for take off and landing above the ground and an improved aircraft capable of attaching and disengaging from that assembly.

BACKGROUND OF THE INVENTION

Aircraft capable of taking off vertically in helicopter mode flight with the fuselage oriented vertically and then converting to horizontal flight in airplane mode with the fuselage oriented horizontally are known in the art. However, these aircraft lack sufficient inherent stability in helicopter mode because the stabilizing wings are fixed and positioned below the center of gravity.

Furthermore, conventional vertical attitude take off and landing and horizontal flight aircraft require a very wide based, heavy landing gear because the aircraft's center of gravity is relatively high off the ground due to the tail sitter configuration. These aircraft require a wide landing gear to keep them from overturning while landing or sitting on the ground and to reduce helicopter ground resonance or dynamic roll-over problems. This problem can be especially severe when trying to land on the deck of a ship which is pitching, rolling and heaving.

To keep the center of gravity of the aircraft as low as possible, shorter, fatter fuselages and larger tail fins have been used. However, these configurations increase the aircraft's weight and drag.

Most prior art aircraft lift vertically with the front fuselage directed skyward. Additionally, there is an aircraft in the prior art, U.S. Pat. No. 3,142,455, that takes off with the rear fuselage directed skyward. However, this aircraft has unstable landing gear.

Additionally, these conventional aircraft do not have acceptable stabilizing wing designs that would cause the fuselage to weathervane into the wind in helicopter mode flight which is necessary for yaw stability and controlling the alignment of the aircraft in the direction of travel. Conventional aircraft usually have a symmetrical stabilizing wing arrangement around the longitudinal axis of rotation.

The present invention overcomes these and other disadvantages in a manner not revealed in the known prior art.

SUMMARY OF THE INVENTION

The present invention provides improvements in the take off and landing operation of vertical take off and landing and horizontal flight aircraft. Applicant's invention engages a ground based beam at a point on the fuselage above the rotor blades.

It is a further object of the invention to provide a method of selectively launching and landing an aircraft adapted for flight in a helicopter mode and in a conventional airplane mode, the method including hovering the aircraft in a tail skyward position; positioning the aircraft adjacent a base docking structure; selectively engaging the base docking structure with a boom portion of the aircraft; attaching the base docking structure to the boom of the aircraft; and storing the aircraft on the base docking structure. Or, when multiple aircraft are using one base docking structure, then transferring the aircraft for storage to a support hanging from the hangar ceiling and suspending the aircraft by a loop on the boom.

It is a further object of the invention to provide a pivotable docking structure for shock absorption as is normally provided by aircraft landing gear.

It is an object of the invention to provide the step of rotating the base docking structure for selective engagement of the base docking structure with the boom.

It is a further object of the invention to provide the step of rotating the base docking structure with the attached aircraft to a storing position.

It is an object of the invention to provide the steps of launching the aircraft from the base docking structure by disengaging the latching means attached to the boom of the aircraft and flying the aircraft away from the base docking structure.

It is a further object of the invention to provide the step of rotating the base docking structure away from the boom.

It is an object of this invention to provide an aircraft capable of taking off and landing with the fuselage oriented vertically and the stabilizing wings of the aircraft pointed skyward.

It is a further object of this invention to provide an aircraft having a fuselage that connects with a support base for suspending the aircraft.

It is another object of this invention to provide an aircraft that can take off and land efficiently on a ship or on a ground transporter.

It is an object of this invention to provide an aircraft that can carry a passenger or a payload and be operated remotely as a drone.

It is an additional object of the invention to provide an aircraft having stabilizer wings configured to cause the upper fuselage in helicopter mode to weathervane about its longitudinal axis, thus providing directional or yaw stability.

It is an object of the invention to rotate the stabilizing wings, or large control surfaces on the stabilizing wings, in line with the airflow in helicopter mode to reduce drag.

It is an object of the invention to provide an aircraft having a front fuselage portion and a rear fuselage portion, the portions having a common longitudinal axis, the aircraft being adapted for flight in a helicopter mode with the longitudinal axis oriented generally vertically and in an airplane mode with the longitudinal axis oriented generally horizontally, the aircraft comprising an elongate boom extending longitudinally from the fuselage for engagement with a base docking structure.

It is a further object of the invention to provide that the aircraft includes a rod disposed within the boom.

It is an additional object of the invention to provide that the aircraft boom has opposed ends and a middle portion, one of the ends having a larger diameter than the middle portion.

It is an object of the invention to provide that the larger diameter of the boom supports the boom when suspended from the base docking structure.

It is a further object of the invention to provide that the aircraft base docking structure is a beam having a latching assembly.

It is also an object of the invention to provide that the latching assembly includes a latching arm pivotally mounted to the beam.

It is an additional object of the invention to provide an aircraft having an end above the rotor and an elongate boom having means for attachment to a base structure with the end above the rotor directed generally skyward.

It is an object of the invention to provide an aircraft having a fuselage with a longitudinal axis, the aircraft being adapted for flight in a helicopter mode with the longitudinal axis oriented generally vertically, and in an airplane mode with the longitudinal axis oriented generally horizontally, the aircraft comprising a plurality of stabilizer wings connected to the fuselage and means for suspending the aircraft disposed on at least one of the stabilizer wings.

It is an object of the invention to provide that the means for suspension includes an elongate member extending outwardly from the stabilizer wings.

It is an object of the invention to provide an aircraft landing and take off assembly for aircraft adapted for flight in a helicopter mode with the longitudinal axis oriented generally vertically and in an airplane mode with the longitudinal axis oriented generally horizontally, the assembly comprising a boom and a structural base having attachment means for engagement of the boom.

It is a further object of the invention to provide that the attachment means includes a latching arm pivotally connected to a beam.

It is also an object of the invention to provide that the beam includes means for disengaging the boom.

It is an object of the invention to provide that the means for disengaging the boom includes an actuator for moving the latching arm in and out of engagement with the boom.

The aircraft and the launching and landing assembly of the invention is inexpensive to manufacture, simple to use and efficient in operation. Further objects and features of the present invention may be obtained by reference to the description of the preferred embodiments of the invention and in the drawing figures.

DESCRIPTION OF THE DRAWINGS:

FIG. 5 is a top plan view of the aircraft approaching the base docking structure;

FIG. 6 is a partial cross-sectional view of the base docking structure;

DESCRIPTION OF THE PREFERRED EMBODIMENTS

Figure 1:
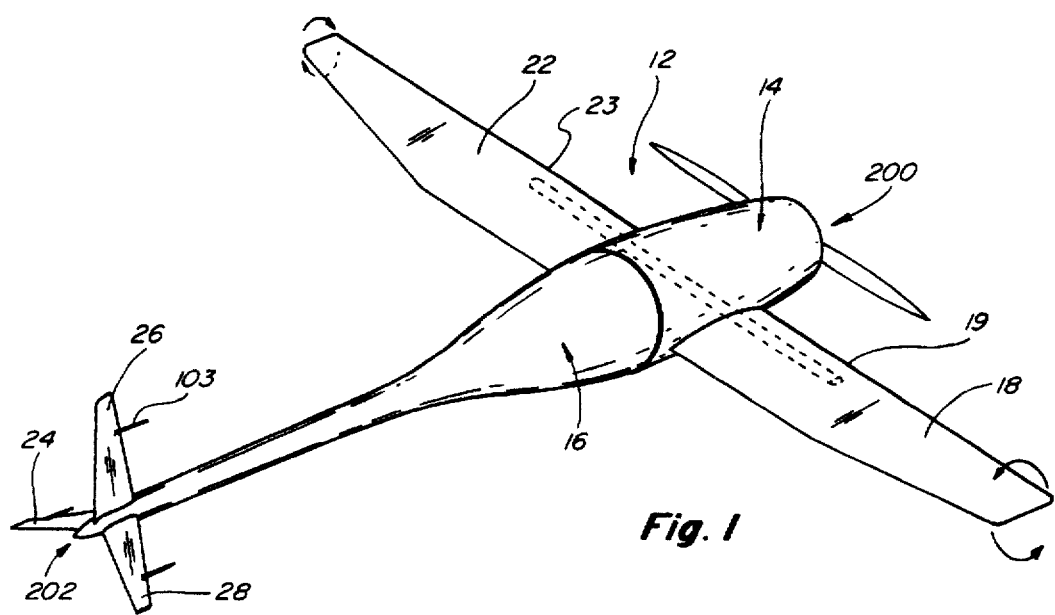
FIG. 1 is a perspective view of the aircraft in horizontal flight.

Referring now by reference numerals to the drawings and first to FIG. 1, it will be understood that the vertical take off and landing and horizontal flight aircraft is generally indicated by 12. The "nose end" of the aircraft is generally indicated by 200 and the "tail end" of the aircraft by 202. The aircraft 12 includes first 14 and second 16 fuselage sections with a pair of rotor blades 18, 22 projecting laterally from the first fuselage section 14. Stabilizer wings 24, 26, 28 project laterally from the second fuselage section 16.

The aircraft 12 may be constructed on a scale to carry a pilot 148 in the second fuselage section 16 or may be unmanned and designed to carry other payloads 148, such as sensors, and be operated remotely as a drone.

Figure 2:
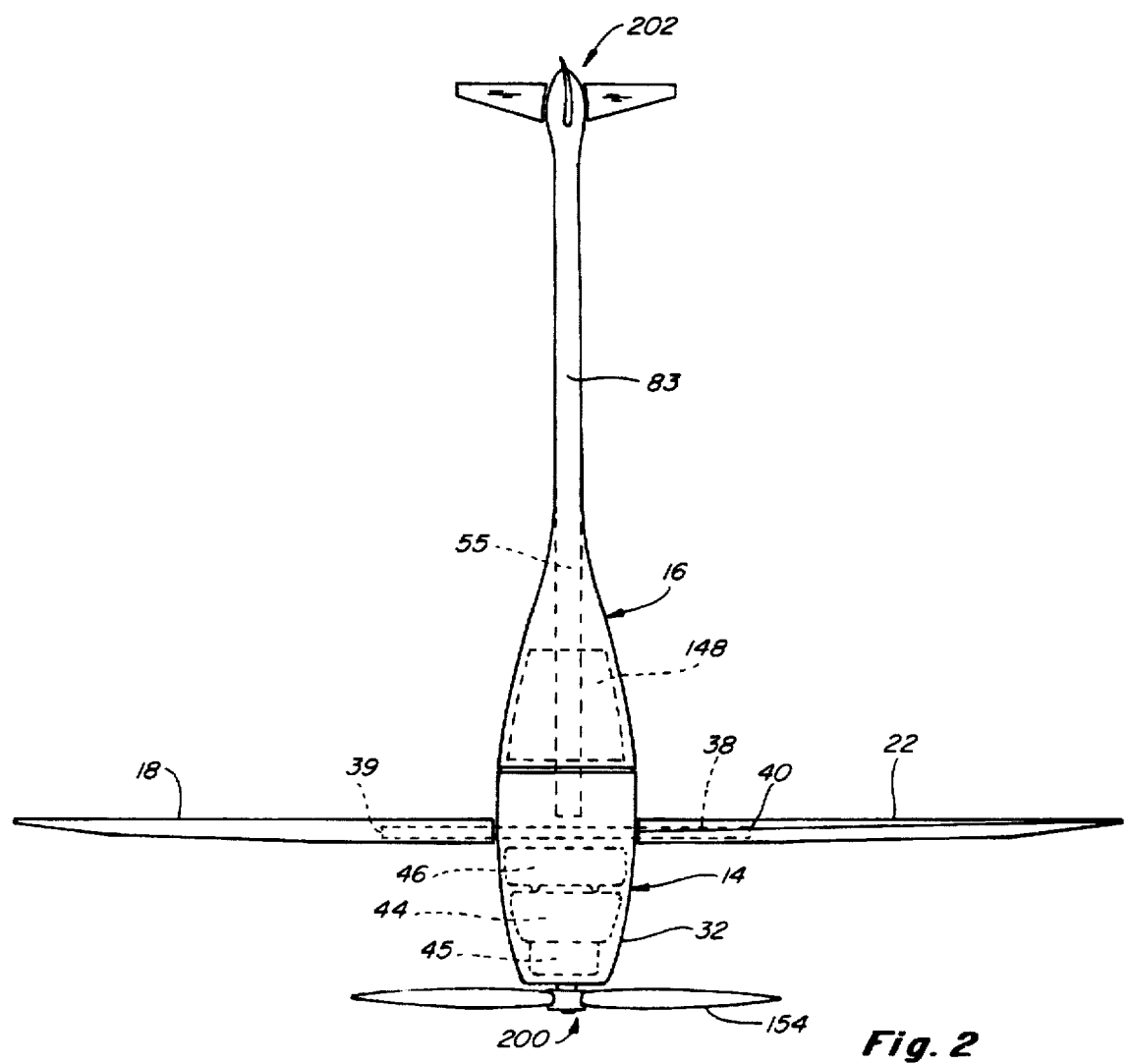
FIG. 2 is a side elevational view of the aircraft in vertical flight.

As shown in FIG. 2, the first fuselage section 14 has a generally cylindrical configuration with an exterior skin 32 having conventional structural framework (not shown) in its interior to provide rigidity to the fuselage section 14. Some of the major internal component parts, such as the engine 44, transmission 45 and fuel tank 46, of the aircraft are located in the forward first fuselage section 14. The fuel tank 46 is connected to the engine 44 in a manner known in the art to supply fuel to the engine 44. In the preferred embodiment, the fuel tank 46 is located near the aircraft's center of gravity so that the aircraft's center of gravity does not change appreciably as fuel is consumed in flight.

The control connections (not shown) between the first 14 and second 16 fuselage sections that control the engine 44, its fuel supply source 46 and the pitch of the rotor blades 18, 22 are conventional connections that provide continued communication between the two fuselage sections 14, 16 even when the first fuselage section 14 is rotating relative to the second fuselage section 16. These conventional control connections may be provided by a mechanical swash-plate connection between the fuselage sections or by conventional electrical slipping connections between the two sections that enable the sections to rotate relative to each other while providing constant electrical communication.

A rod 38, such as the hollow tube shown in FIG. 2, extends transversely through the interior of the first fuselage section 14. The rod 38 has opposed ends 39, 40 projecting through diametrically opposite sides of the fuselage skin 32. Rotor blades 18, 22 are connected about the ends 39, 40 of rod 38 to permit rotation of the blades.

As can be seen in FIG. 2, the first 14 and second fuselage sections 16 are connected for relative rotation of the sections about the aircraft's longitudinal axis. A shaft 55 is disposed along the longitudinal axis and extends from the tail end 202 of the aircraft through the second fuselage section 16 and into the first fuselage section 14. The first fuselage section 14 is connected to the rod 55 with bearings (not shown) to allow rotation about the longitudinal axis, as is well known in the art. The second fuselage section 16 is integral with a portion of rod 55.

Figure 4:
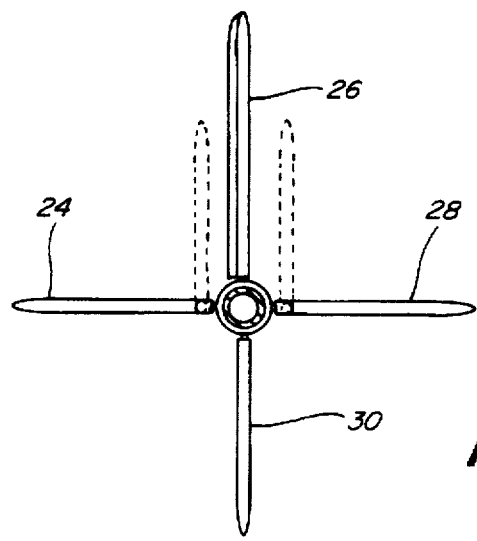
FIG. 4 is an alternative arrangement of the stabilizer wings.

As can be seen in FIG. 1, three stabilizer wings 24, 26, 28 are rotatably mounted to the second fuselage section 16. The wings 24, 26, 28 are configured to provide generally equal spacing between each wing such as at 120° intervals as shown. Alternatively, four wings 24, 26, 28, 30 could be spaced at 90° intervals as shown in FIG. 4. These balanced configurations stabilize the aircraft in pitch and yaw during aircraft mode flight. In both configurations, stabilizer wing 26 is generally larger, longer or more highly swept than the other wings to better catch the wind in helicopter horizontal flight mode so that it will cause the second fuselage section 16 to rotate about its longitudinal axis until stabilizer wing 26 is pointing away from the relative wind and direction of travel. Stabilizer wing 26 causes the second fuselage section 16 to weathervane and, thus, orients the second fuselage section 16 about the longitudinal axis to align the aircraft in the appropriate direction in helicopter mode. Stabilizer wing 26 also aids the pilot in orienting and controlling the aircraft. Stabilizer wing 26 could be painted a different color than the other wings to allow a remote pilot to determine the direction of the aft fuselage 16 and, therefore, orient the aircraft 12 about its longitudinal axis. It will be recognized that the stabilizer wings 24, 26, 28 could be of the same design if the entire assembly is located aft of the longitudinal axis of rotation in helicopter mode.

Stabilizing wings 24 and 28 may be folded aft to the dashed position shown in FIG. 4 by actuators (not shown) if it is desired to reduce drag or pitching moments in helicopter mode flight. By changing the stabilizing wing position to be either fully folded back or partially folded back, the aircraft can trim its helicopter pitching moment and relieve the rotor from having to perform this function.

Alternatively, the stabilizing wings 24 and 28 or conventional control surfaces on the stabilizing wings may be constructed so as to weathervane about their respective lateral axis. Weathervaning of the stabilizing wings assists the aircraft in horizontal flight in helicopter mode. Rods (not shown) are disposed within the stabilizing wings and extend from the wings to the second fuselage section 16. The rods are connected to the second fuselage 16 with bearings (not shown) to permit free rotation, or weathervaning, of the wings about their lateral axis when the aircraft is flying in horizontal helicopter mode. When the aircraft is in airplane mode, an electric powered rotary actuator (not shown) rotates the rods. The rods then rotate the wings in the desired rotational position for airplane mode flight, as known in the art. It is desirable to rotate the stabilizing wings for aircraft having stabilizing wings positioned below the rotor in hover because powerful destabilizing forces will be generated unless a majority of the wing surface area is capable of rotating or weathervaning into the wind. It is beneficial for all configurations if drag or pitching moment reduction in helicopter translational mode is desired.

The aircraft 12 of the invention is capable of both vertical flight in helicopter mode and horizontal flight in airplane mode. Landing and take off of the aircraft 12 is accomplished in helicopter mode, as explained below.

Figure 3:
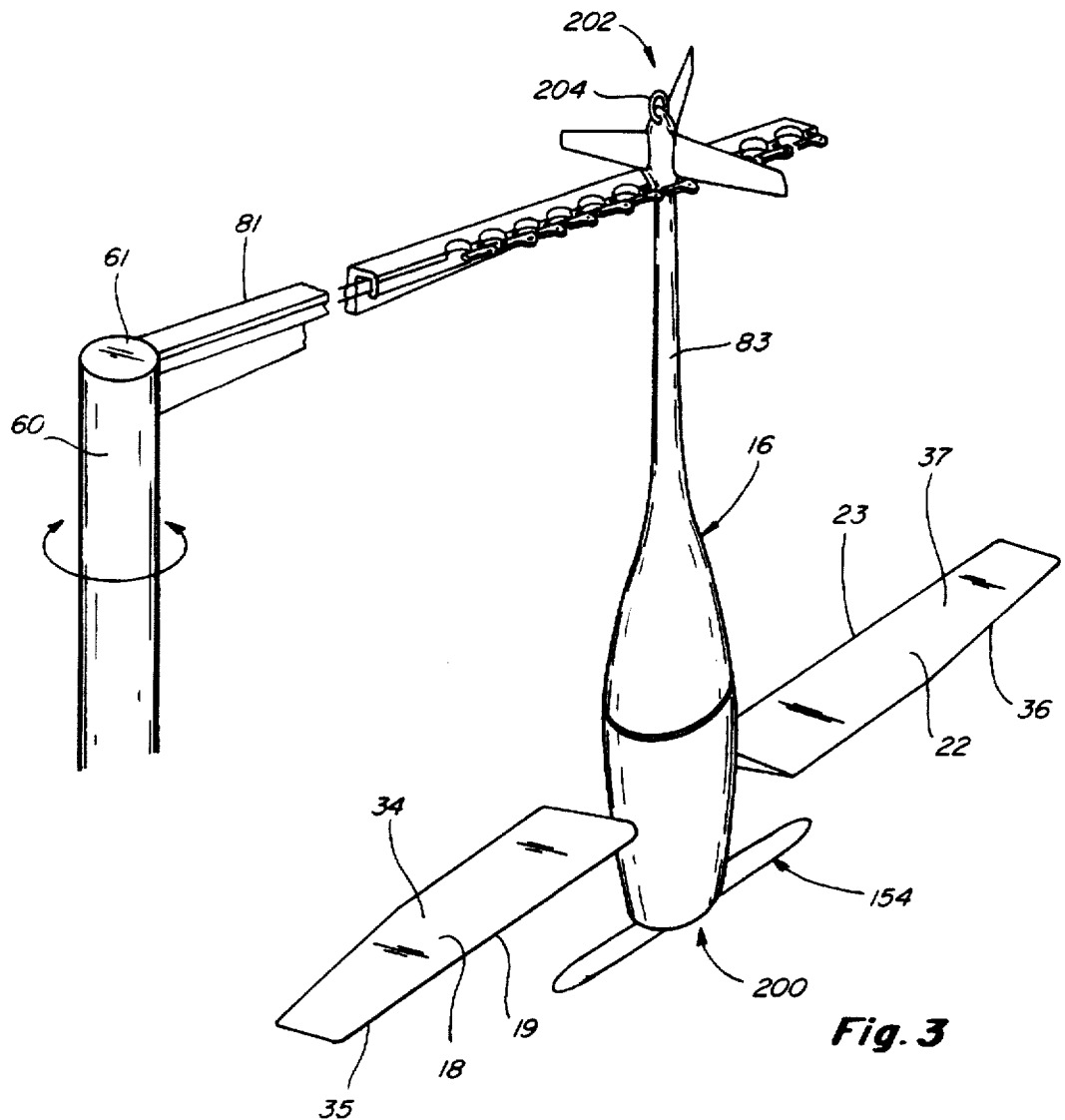
FIG. 3 is a perspective view of the aircraft attached to the base docking structure.

In helicopter mode, aircraft 12 operates in a manner well known in the art. The invention 12 takes off from a position with the tail end 202 skyward and the nose 200 toward the ground, as shown in FIG. 3. Rotor blades 18, 22 are attached to the first fuselage section 14 with the top surface 34 of rotor blade 18 and the underside surface 37 of rotor blade 22 directed skyward, as shown in FIG. 3. Engine 44 provides the torque to power propeller assembly 154 through transmission 45 which in turn provides part of the lift for the aircraft in helicopter mode. The propeller blades are generally positioned perpendicular to the aircraft's longitudinal axis but with leading edges angled upwardly toward the stabilizing wings to operate in a "pusher" propeller manner, as is known in the art. Because the engine 44 and transmission 45 are providing a torque to the propeller assembly 154 they produce an equal and opposite torque to the first fuselage section 14 causing it to rotate together with rotor blades 18, 22 about the longitudinal axis in the opposite direction of rotation as the propeller assembly 154 by the torque exerted on the first fuselage section 14 by the engine 44. Thus, engine 44 powers the propeller assembly 154 and rotates the first fuselage section 14 together with the rotor blades 18, 22 relative to the second fuselage section 16 to operate the aircraft 12 in vertical flight or helicopter mode.

For vertical lift, the pilot increases power to the engine and pulls up on his collective control lever, raising the leading edges 19, 23 of the rotor blades 18, 22 toward the stabilizing wings and raising the leading edges 7, 8 of the variable pitch propeller blades. This causes the aircraft 12 to lift vertically or generally along the aircraft's longitudinal axis. As the aircraft 12 lifts vertically, its altitude can be adjusted by varying the power and raising or lowering the leading edges 19, 23 of the rotor blades 18, 22 and leading edges 7, 8 of the propeller blades. Translational or horizontal helicopter mode flight can be controlled with adjustments to the cyclic pitch of the rotor blades 18, 22 as is done in conventional helicopters. Adjustment of the cyclic pitch is accomplished by altering the rotor blade pitch as a function of the position of the rotor blade about the plane of rotation of the rotor blades. The resulting difference in aerodynamic forces on the opposite sides of the rotor blades 18, 22 causes the aircraft 12 to tilt in a particular direction of movement in the horizontal plane resulting in the aircraft 12 moving in that direction. Horizontal flight of the aircraft 12 is accomplished by tilting the rotor plane circumscribed by the rotation of the rotor blades 18, 22 with cyclic pitch controls, as is done in conventional helicopters. In the invention, as aircraft 12 moves horizontally, stabilizing wing 26 orients the second fuselage section 16 in the direction of flight by rotating the second fuselage section 16 about the longitudinal axis.

Conversion from helicopter mode or vertical flight to airplane mode or horizontal flight is performed at a safe altitude above the ground. Starting from a hover, the thrust of the propeller assembly 154 is converted from reverse thrust used in helicopter flight to forward thrust used in airplane mode flight by rotating the leading edges of the propeller blades down away from the stabilizing wings, as is known in the art for variable pitch propellers. Concurrently, the leading edges 19, 23 of rotor blades 18, 22 are rotated more than 90° about rod 38 until they point generally straight downward toward nose end 200. Aerodynamic forces exerted on the rotor blades 18, 22 stop their rotation along with the rotation of the first fuselage section 14. The aircraft is now positioned for airplane mode. At this point, the aircraft 12 is dropping downward. When sufficient airspeed has been obtained, rotor blades 18, 22 are rotated to a position with the leading edges 19, 23 angled to provide positive incidence to generate lift for a "pull up" into conventional horizontal airplane mode flight. After conversion to horizontal flight, the rotor blades 18, 22 have been rotated with the leading edges 19, 23 directed generally along the longitudinal axis to generate lift as aircraft wings instead of helicopter rotor blades.

Controlling the aircraft's roll is accomplished by controlling the collective pitch of the rotor blades 18, 22 similar to the method used for controlling the blade pitch in the helicopter or vertical flight mode, as is well known in the art. For example, the roll of the aircraft 12, about its longitudinal axis, can be controlled by increasing the lift on one rotor blade 18 by rotating the blade's leading edge 19 upward and decreasing the lift on the other rotor blade 22 by rotating its leading edge 23 downward. This allows the right and left turning of the aircraft to be accomplished by decreasing the lift of the blade on the side to which a turn is desired and increasing the lift of the blade on the opposite side.

The aircraft's ascent and descent is controlled by altering the pitch of both rotor blades 18, 22 simultaneously to either raise the leading edges 19, 23 of both blades 18, 22 or lower the leading edges 19, 23 of both rotor blades. By controlling the pitch of the rotor blades 18, 22, the aircraft 12 is controlled in horizontal flight while the stabilizer wings 24, 26, 28, 30 stabilize the aircraft 12 in pitch and yaw.

To convert from airplane mode to helicopter mode, the upper surface 34 of rotor blade 18 is directed toward the tail end 202 and the upper surface 36 of rotor blade 22 is directed toward the nose end 200 by rotating the blades 18, 22 about rod 38 approximately 90° until the rotor blades 18, 22 are directed generally perpendicular to the aircraft's longitudinal axis. This causes the rotor blades 18, 22 to spin the first fuselage section 14 relative to the second fuselage section 16. By rotating the rotor blades 18, 22 approximately 90° in opposite directions, the aircraft's horizontal velocity slows and the aircraft 12 begins to drop vertically. When the aircraft is dropping, the stabilizing wings 24, 26, 28, 30 help keep the nose end 200 of the aircraft 12 pointed in the direction of flight. The first fuselage section 14 is rotating relative to the second fuselage section 16 and by changing the propeller assembly 154 to the reverse thrust position and angling the leading edges 19, 23 of the blades 18, 22 upwards toward the tail end 202 to generate lift, the aircraft 12 is again in helicopter mode.

It will be understood by those familiar with the art that the aircraft 12 would operate in the same manner in helicopter mode but fly in the opposite direction if designed as a "canard" winged aircraft. For a canard aircraft, a propeller assembly would not reverse thrust from helicopter to airplane mode and the leading edges of the blades 18, 22 would be rotated slightly less than 90° in the opposite direction to point toward tail end 202 of the aircraft. Also, for a canard aircraft, the stabilizing wings would consist of either wings 26 and 30, or wings 24 and 28. Additionally, in a canard aircraft, directional stability would be provided by stabilizing wing surfaces oriented generally vertically in airplane mode and mounted in the rear of the fuselage (the nose end 200 in FIG. 2). It will also be understood that as a canard aircraft, the component parts may be named differently, for example, the rear fuselage might be called the forward fuselage.

As can be seen in FIG. 2, the aircraft includes a boom generally indicated by 83, capable of engagement with a support structure such as beam 81. The boom 83 is generally elongate and cylindrical in shape. It may be formed as an extension of the rear fuselage 16. The boom 83 extends generally between the stabilizing wings or tail end 202 and the rear fuselage 16. It can be seen that the boom 83 has an increased diameter as it approaches the stabilizing wings. Since the boom 83 is basically an elongate extension of the rear fuselage 16, its structural framework is similar to that of conventional rear fuselages. As seen in FIG. 1, rod 55 is disposed within the aircraft and extends generally the entire length of boom 83, the rear fuselage 16 and into a portion of the forward fuselage 14. Rod 55 extends along the aircraft's longitudinal axis. Rod 55 increases the strength and stability of boom 83 and is preferably cylindrical and partially integral with the boom portion 83 of rear fuselage 16 for maximum support. For example, the composite structures of the rear fuselage 16 can be built onto the perimeter of rod 55.

The elongate structure of boom 83 can be used for engagement with many different support bases or foundations. For example, the boom 83 can engage structural beam 81, shown in FIGS. 3 and 5. Beam 81 may be connected to various bases or foundations 60, such as a ground based pole, a trailer transporter, a building or a ship. Preferably, beam 81 is well padded to absorb shock and avoid damage to the boom 83 and stabilizer wings 24, 26, 28. As can be seen in FIG. 3, beam 81 is preferably pivotable about its base 60 to further absorb shock. Or shock absorbers of some type (not shown) could be used between the beam and base. For example, a hinged connection of beam 81 to base 60 with a spring and shock absorber could be used to allow vertical deflection of the outer end of the beam, thus cushioning the vertical load as the aircraft's weight is transferred to the beam. Beam 81 may pivot about the base 60 freely or movement may be controlled, such as by a motor, to allow the entire beam 81 to be pivoted to another location such as onto a ship's deck or into a hangar.

The beam 81, shown in FIGS. 3, 5 and 6, is comprised of a latching arm assembly 85 positioned along the length of beam 81 for trapping the aircraft boom 83. Individual latching arms 86 are pivotally connected to rods 87 in a spring-loaded fashion. Rods 87 extend generally perpendicular from beam 81 with latching arm 86 being pivotally mounted about point 88 generally perpendicular to rod 87 and parallel to beam 81. When boom 83 applies pressure to latching arm 86, as shown in FIG. 9, latching arm 86 pivots about point 88 toward beam 81 then traps boom 83 between beam 81 and latching arm 86 in recess 5 when latching arm 86 is urged back to its original position.

Figure 7:
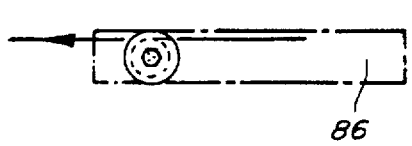
FIG. 7 is a side phantom view of the attachment arm.
Figure 8:
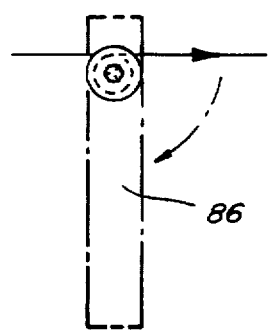
FIG. 8 is a side phantom view of the attachment arm when the cable is tightened.

As shown in FIGS. 5 and 6, the latching arm assemblies 85 are positioned along the length of beam 81 and are connected by a rope or cable 89 that wraps around the rods 87 to provide a type of pulley system. For example, as seen in FIG. 6, one end of cable 89 is attached to an actuator 90, such as a hydraulic mechanism or solenoid, that can be activated to pull or release the cable 89. Cable 89 extends from actuator 90 around each of the rods 87, to a spring 70 at its other end. The latching arms 86 are kept generally parallel to the beam 81 by spring 70 as shown in FIG. 7. By pulling or tightening the cable 89, rods 87 and, therefore, the latching arm assemblies 85 are rotated approximately 90° in a downward motion, as shown in FIG. 8. This causes latching arms 86 to rotate downwards and away from boom 83, thereby releasing the boom. The aircraft 12 can then be flown away from boom 81 or boom 81 can be swung away from aircraft 12 about the base 60. By deactivating the actuator 90, spring 70 urges rods 87 and, therefore, the latching arm assemblies 85 to return to their original extended position for trapping boom 83.

Figure 9:
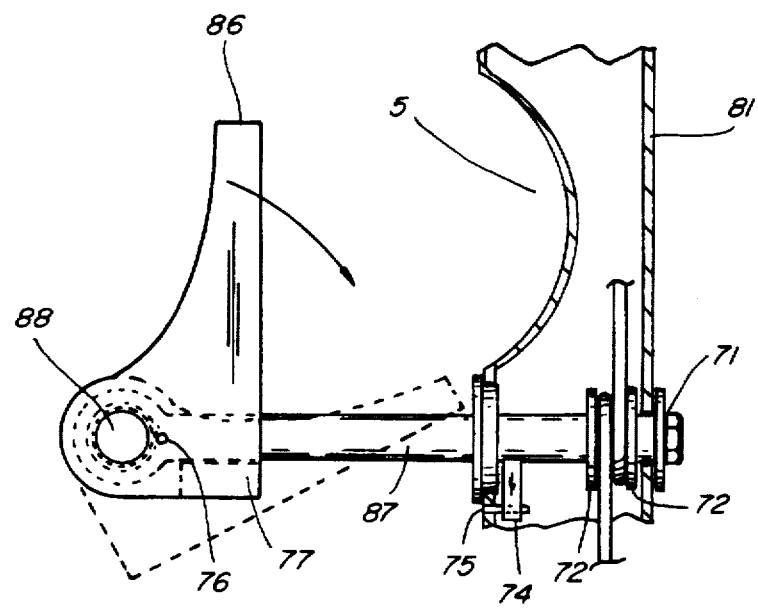
FIG. 9 is a partial cross-sectional top plan view of the attachment assembly.
Figure 10:
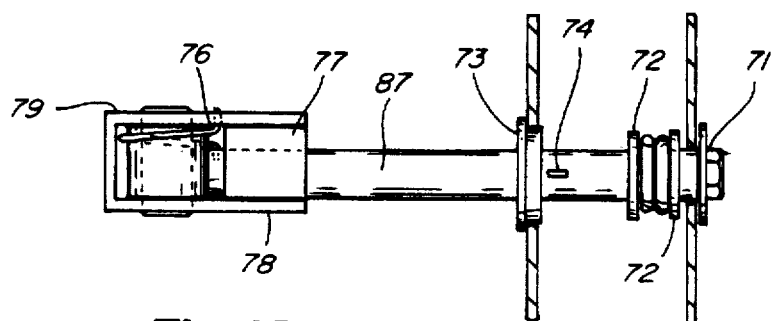
FIG. 10 is a partial cross-sectional side view of the attachment assembly.

The latching arm assembly 85 may be constructed as shown in FIGS. 9 and 10. The rod 87 is connected to the beam 81 using a fastener 71, which is fastened into rod 87 through beam 81. Flanges 72 may be disposed along the outside of cable 89, which is-wrapped around rod 87 in pulley fashion. A hub or shoulder 73 is provided on rod 87 adjacent the beam 81 to fix the position of the latching assembly 85 along the beam 81. A stopping assembly is provided on rod 87 to control the movement of the latching assemblies 85 when the actuator 90 is activated. The stopping assembly may be comprised of an ear 74 and a fixed stop 75, as shown in FIG. 9. The ear 74 may be an elongate member extending from rod 87 that is long enough to engage fixed stop 75 when rod 87 is rotated. The fixed stop 75 may be an elongate member attached to the beam 81 and extending outwardly therefrom for engagement with the ear 74.

As previously stated, latching arm 86 is pivotally mounted to rod 87. This may be accomplished with a pin 88 and bore arrangement where a bore is provided on the end of rod 87 through which a pin 88 pivotally mounts the latching arm 86. A spring 76 is provided within this arrangement, such as the coil spring shown. The spring 76 tends to urge the latching arm 86 outwards, opposite the direction shown in FIG. 9.

The latching arm 86 has opposed sides 78, 79 with a spacer 77 therebetween. The spacer 77 is positioned adjacent rod 87 when the latching arm 86 is parallel to the beam 81 and prevents the latching arm 86 from rotating further outward as the spring 76 urges the arm 86 outwardly.

Operation of the aircraft's launching and landing will be briefly described with reference to the drawings. As seen in FIG. 5, during landing, aircraft 12 is flown near beam 81 until boom 83 and beam 81 engage or beam 81 may be swung towards boom 83 until the two engage. As shown in FIG. 9, engagement is accomplished from the boom 83 pressing on latching arm 86 and urging it inward, against spring 76 resistance, toward the beam 81. Once the boom 83 clears latching arm 86, the latching arm 86 swings back to its original position where it is stopped by spacer 77. The boom is now positioned in recess 5 between the latching arm 86 and beam 81. Once engaged, the aircraft 12 is lowered until the portion of the boom 83 that widens toward the stabilizer wings 24, 26, 28 rests on beam 81 to support the aircraft 12. It will be understood that stabilizer wings 24, 26, 28 can be used in conjunction with the tail boom 83 to help support the aircraft 12. Or stabilizing wings 24, 26, 28 can be used to support all of the aircraft 12. If desired, the beam 81 with aircraft 12 can then be rotated into a hangar or other storage area. An attachment means, such as the loop 204 shown at the tail end 202 of the aircraft 12 in FIG. 3, can be used to hang the aircraft from a ceiling hook located within a hangar.

During take off, the aircraft 12 is raised vertically and stabilizer wings 24, 26, 28 no longer rest on beam 81. The aircraft hovers while actuator 90 is activated to swing latching arm 86 downwards. Ear 74 hits stop 75 to keep the latching arms 86 in an approximate 90° rotation. The aircraft 12 can now be flown away and/or beam 81 can be pivoted away from the aircraft. The actuator 90 is deactivated to return the latching assemblies to a landing state.

As mentioned, beam 81 may extend from the side of a ship 60 to allow aircraft 12 to land at a point away from conventional landing pads. The boom can also be swung along with the aircraft into a hangar. Since the aircraft will already be hooked, it is not necessary for sailors to hook the aircraft onto ceiling hooks in the hangar unless more than one aircraft per beam is used. With the invention, the roll, pitch and yaw positions of a ship are less critical for landing and take off and the beam 81 can be either manually or automatically stabilized with a control system to hold the beam in a fixed point in space to provide an easier landing. Additionally, roll over and other problems normally experienced with conventional helicopter landings are eliminated.

With the improved landing and take off of the invention, the weight and drag of conventional landing gear is eliminated. Furthermore, the longer boom 83 allows smaller stabilizing wings 24, 26, 28 which reduces drag.

In an alternative embodiment, shown in FIG. 1, spikes 103 are provided on the stabilizing wings 24, 26, 28 for landing the aircraft 12 in an emergency situation. The spikes 103 could also be used for extended airborne reconnaissance or ground loiter. The spikes 103 will keep a stabilizer wing hooked onto lines such as power lines, ship riggings or overhead structures such as bridges, cranes, street signs or lights. Wires or beams placed in areas requiring extended airborne reconnaissance, such as by fire towers or over a downtown high crime area, allow the aircraft 12 to monitor large areas for extended periods of time. The aircraft 12 could then be remotely operated when required.

Because of the landing approach disclosed, it should be understood that the forward and rear fuselage structures could be built in one piece without the need for bearings between the two portions if the base docking structure supported the aircraft boom by rollers or if the aircraft boom has a rotating collar that allowed support of the rotating aircraft. In this case, the swash plate actuators would be mounted with a gyroscope so as not to rotate about the longitudinal axis with the rest of the aircraft to facilitate control of the aircraft.

Although a propeller powered aircraft has been described, it will be recognized that the invention also applies to a jet powered aircraft with a reaction drive rotor such as that described in U.S. Pat. No. 5,516,060.

All of the invention has been described by making detailed reference to preferred embodiments. Such detail should be understood by those skilled in the art as instructive rather than in any restrictive sense. Many other variants are possible within the scope of the claims hereunto appended. The invention is not to be limited to the specifics as shown here for purposes of illustration but only by the scope of the appended claims and their equivalents.

I claim as my invention:

1. An aircraft having a fuselage with an aft portion and a fore portion, said fuselage having a longitudinal axis, the aircraft being adapted for flight in a helicopter mode with the longitudinal axis oriented generally vertically and in an airplane mode with the longitudinal axis oriented generally horizontally, the aircraft comprising:
   (a) at least a pair of rotor blades, each blade having a lateral axis and each blade being connected to the fuselage for rotation about its lateral axis relative to the fuselage; and
   (b) a plurality of stabilizer wings connected to the aft portion in helicopter mode;
   (c) said rotor blades having a leading edge and being positioned generally perpendicular to the longitudinal axis with leading edges angled generally upwardly toward the stabilizing wings in helicopter mode and generally away from the stabilizing wings in airplane mode flight.

2. The aircraft of claim 1, the aircraft having:
   (d) an elongate boom extending longitudinally from the fuselage for engagement with a base docking structure for launching and landing of the aircraft.

3. The aircraft of claim 2, further comprising:
   (e) a rod disposed within the boom for reinforcement.

4. The aircraft of claim 3, in which:
   (f) the boom has opposed ends and a middle portion, one of said ends having a larger diameter than the middle portion.

5. The aircraft of claim 4, in which:
   (g) the larger diameter of the boom supports said boom when suspended from the base docking structure.

6. The aircraft of claim 2, in which:
   (e) the base docking structure is a beam having a latching assembly.

7. The aircraft of claim 6, in which:
   (f) the latching assembly includes a latching and pivotally mounted to the beam.

8. The aircraft of claim 2, further comprising:
   (e) a tail end; and
   (f) an elongate boom having means for attachment to a base structure with the tail end directed generally skyward.

9. The aircraft of claim 1, the aircraft having:
   (d) a plurality of stabilizer wings connected to the fuselage; and (e) means for suspending the aircraft disposed on at least one of the stabilizer wings.

10. The aircraft of claim 9, in which:

(f) the means for suspension is an elongate member extending outwardly from the stabilizer wings.

11. The aircraft of claim 1, the aircraft having:

(d) a boom; and (e) a structural base having attachment means for engagement of the boom.

12. The aircraft of claim 11, in which:

(f) the attachment means includes a latching arm pivotally connected to a beam.

13. The aircraft of claim 12, in which:

(g) the beam includes means for disengaging the boom.

14. The aircraft of claim 13, in which:

(h) the means for disengaging the boom includes an actuator for selective engagement of the boom.

15. An aircraft having a fuselage with a longitudinal axis, the aircraft being adapted for flight in a helicopter mode with the longitudinal axis oriented generally vertically and in an airplane mode with the longitudinal axis oriented generally horizontally, the aircraft comprising:

(a) the fuselage consisting of a first and a second coaxial section that are connected together;

(b) at least a pair of rotor blades each having a lateral axis and each being connected to the first fuselage section for rotation of each rotor blade about its lateral axis relative to the first fuselage section;

(c) a plurality of stabilizer wings connected to the second fuselage section; and (d) a propeller engine being secured inside the first fuselage section that rotates a propeller outside the first fuselage section in a first direction of rotation, and torque exerted on the propeller by the engine also generates an equal and opposite torque reaction on the first fuselage section and causes the first fuselage section together with the rotor blades to rotate in a second direction of rotation opposite to the first direction of rotation;

(e) said propeller having blades with a leading edge, and said leading edges being angled toward the stabilizing wings in helicopter mode.

16. The aircraft of claim 15, in which:

(f) said propeller blades are positioned with the leading edges angled away from the stabilizing wings during horizontal aircraft mode flight.

17. An aircraft having a fuselage with a longitudinal axis, the aircraft being adapted for flight in a helicopter mode with the longitudinal axis oriented generally vertically and in an airplane mode with the longitudinal axis oriented generally horizontally, the aircraft comprising:

(a) the fuselage having coaxial sections connected for relative rotation of the sections about the longitudinal axis;

(b) a pair of rotor blades, each blade having a lateral axis and being connected to the fuselage for rotation about its lateral axis relative to the fuselage to a fixed win& position for airplane mode flight; and (c) a plurality of stabilizing wings connected to said fuselage;

(d) said stabilizing wings being asymmetrical about the longitudinal axis of rotation of the fuselage.

18. The aircraft of claim 17, in which:

(e) said stabilizing wings are biased to a rear portion of the fuselage in helicopter mode to cause the fuselage to weathervane into the direction of flight in helicopter mode.

19. The aircraft of claim 17, in which:

(e) at least one of said stabilizer wings has a control surface rotatable in plane with the airflow in translational helicopter mode flight.

20. An aircraft having a fuselage with an aft portion and a fore portion, said fuselage having a longitudinal axis, the aircraft being adapted for flight in a helicopter mode with the longitudinal axis oriented generally vertically and in an airplane mode with the longitudinal axis oriented generally horizontally, the aircraft comprising:

(a) at least a pair of rotor blades, each blade having a lateral axis and each blade being connected to the fuselage for rotation about its lateral axis relative to the fuselage; and (b) a plurality of stabilizing wings connected to said fuselage;

(c) at least one of said stabilizing wings is rotatable in plane with the airflow in translational helicopter mode flight.

21. An aircraft having a fuselage with a longitudinal axis, the aircraft being adapted for flight in a helicopter mode with the longitudinal axis orbited generally vertically and in an airplane mode with the longitudinal axis oriented generally horizontally, the aircraft comprising;

(a) the fuselage having coaxial sections connected for relative rotation of the sections about h longitudinal axis;

(b) a pair of rotor blades, each blade having a later axis and being connected to the fuselage for rotation about its lateral axis relative to the fuselage; and (c) a plurality of stabilizing wings connected to said fuselage;

(d) said stabilizing wings being asymmetrical about the longitudinal axis of rotation of the fuselage, and wherein (e) said stabilizing wings are biased to a rear portion of the fuselage in helicopter mode to cause the fuselage to weathervane into the direction of flight in helicopter mode.

22. An aircraft having a fuselage with a longitudinal axis, the aircraft being adapted for flight in a helicopter mode with the longitudinal axis oriented generally vertically and in an airplane mode with the longitudinal axis oriented generally horizontally, the aircraft comprising:

(a) the fuselage having coaxial sections connected for relative rotation of the sections about the longitudinal axis;

(b) a pair of rotor blades, each blade having a lateral axis and being connected to the fuselage for rotation about its lateral axis relative to the fuselage; and (c) a plurality of stabilizing wings connected to said fuselage;

(d) said stabilizing being asymmetrical about the longitudinal axis of rotation of the fuselage, and wherein (e) at least one of said stabilizer wings has a control surface rotatable in plane with the airflow in translational helicopter mode flight.

* * * * *

UNITED STATES PATENT AND TRADEMARK OFFICE
CERTIFICATE OF CORRECTION

PATENT NO. : 5,799,900
DATED : September 1, 1998
INVENTOR(S) : McDonnell, William R.

It is certified that error appears in the above-identified patent and that said Letters Patent is hereby corrected as shown below:

Claim 17, column 11, line 62, "win&" should be -- wing --.

Claim 21, column 12, line 28, "orbited" should be -- oriented -- line 32, "h" should be -- the --;

line 34, "later" should be -- lateral --.

Signed and Sealed this

Twelfth Day of January, 1999

Attest:

Attesting Officer     *Acting Commissioner of Patents and Trademarks*